US009961550B2

(12) United States Patent
Vaswani et al.

(10) Patent No.: US 9,961,550 B2
(45) Date of Patent: May 1, 2018

(54) PHYSICALLY SECURED AUTHORIZATION FOR UTILITY APPLICATIONS

(75) Inventors: Raj Vaswani, Portola Valley, CA (US); Wilson Chuen Yew Yeung, Campbell, CA (US); Cristina Seibert, Mountain View, CA (US); Nelson Bruce Bolyard, Milpitas, CA (US); Benjamin N. Damm, San Francisco, CA (US); Michael C. StJohns, Germantown, MD (US)

(73) Assignee: ITRON NETWORKED SOLUTIONS, INC., Liberty Lake, WA (US)

( * ) Notice: Subject to any disclaimer, the term of this patent is extended or adjusted under 35 U.S.C. 154(b) by 1382 days.

(21) Appl. No.: 12/939,702

(22) Filed: Nov. 4, 2010

(65) Prior Publication Data
US 2012/0116602 A1 May 10, 2012

(51) Int. Cl.
*H04L 9/32* (2006.01)
*H04L 12/28* (2006.01)
(Continued)

(52) U.S. Cl.
CPC ............ *H04W 12/08* (2013.01); *G06F 21/33* (2013.01); *G06F 21/602* (2013.01);
(Continued)

(58) Field of Classification Search
CPC ......... G06Q 50/06; H04L 63/10; H04L 63/20; H04L 63/04
(Continued)

(56) References Cited

U.S. PATENT DOCUMENTS 7,770,789 B2   8/2010  Oder, II et al.
8,321,915 B1 * 11/2012 Bartolucci et al. ............... 726/4
(Continued)

FOREIGN PATENT DOCUMENTS

CN      1318161 A    10/2001
CN    201118607 Y     9/2008
(Continued)

OTHER PUBLICATIONS

Notification of Transmittal of the International Search Report (Form PCT/ISA/220 and PCT/ISA 210) and the Written Opinion of the International Searching Authority (Form PCT/ISA/237) dated Apr. 18, 2012, issued in the corresponding International Application No. PCT/US2011/055705. (9 pages).
(Continued)

*Primary Examiner* — Alexander Lagor
(74) *Attorney, Agent, or Firm* — Buchanan Ingersoll & Rooney PC

(57) ABSTRACT

To provide overall security to a utility management system, critical command and control messages that are issued to components of the system are explicitly approved by a secure authority. The explicit approval authenticates the requested action and authorizes the performance of the specific action indicated in a message. Key components of the utility management and control system that are associated with access control are placed in a physical bunker. With this approach, it only becomes necessary to bunker those subsystems that are responsible for approving network actions. Other management modules can remain outside the bunker, thereby avoiding the need to partition them into bunkered and non-bunkered components. Access to critical components of each of the non-bunkered subsystems is controlled through the bunkered approval system.

33 Claims, 5 Drawing Sheets

(51) Int. Cl.
*H04W 12/08* (2009.01)
*G06F 21/33* (2013.01)
*G06F 21/62* (2013.01)
*H04L 29/06* (2006.01)
*G06F 21/60* (2013.01)
*G07C 9/00* (2006.01)
*H04L 9/08* (2006.01)
*G06Q 50/06* (2012.01)

(52) U.S. Cl.
CPC ....... *G06F 21/629* (2013.01); *G07C 9/00031* (2013.01); *H04L 9/0897* (2013.01); *H04L 9/3268* (2013.01); *H04L 63/10* (2013.01); *H04L 63/20* (2013.01); *G06Q 50/06* (2013.01)

(58) Field of Classification Search
USPC .......................................................... 726/2
See application file for complete search history.

(56) References Cited

U.S. PATENT DOCUMENTS

| | | | |
|---|---|---|---|
| 2002/0108046 A1* | 8/2002 | Armingaud | 713/183 |
| 2002/0162019 A1* | 10/2002 | Berry et al. | 713/201 |
| 2003/0056130 A1 | 3/2003 | Anzai | |
| 2003/0196083 A1 | 10/2003 | Grawrock et al. | |
| 2005/0144437 A1* | 6/2005 | Ransom et al. | 713/151 |
| 2006/0125421 A1 | 7/2006 | Costa | |
| 2008/0222714 A1 | 9/2008 | Wahl | |
| 2010/0044433 A1 | 2/2010 | Wankmueller et al. | |
| 2010/0241848 A1* | 9/2010 | Smith et al. | 713/153 |
| 2010/0275016 A1 | 10/2010 | Zimmer et al. | |
| 2011/0208366 A1* | 8/2011 | Taft | H04L 29/08846 700/295 |
| 2012/0078548 A1* | 3/2012 | Salazar et al. | 702/62 |

FOREIGN PATENT DOCUMENTS

| | | |
|---|---|---|
| CN | 101467131 A | 6/2009 |
| EP | 1 519 531 A2 | 3/2005 |
| TW | 552757 B | 9/2003 |

OTHER PUBLICATIONS

Official Letter dated Apr. 7, 2014, by Taiwan Intellectual Property Office (TIPO) in corresponding Taiwan Patent Application No. 100139923 and an English Translation of the Official Letter. (16 pages).

Jun. 1, 2015 Chinese Office Action issued in Chinese Application No. 201180059505.X (with English language translation).

Extended European Search Report dated Nov. 28, 2016, by the European Patent Office in corresponding European Application No. 11838427.0-1853. (7 pages).

Nov. 12, 2015 Taiwanese Office Action issued in Taiwanese Application No. 100139923.

* cited by examiner

PHYSICALLY SECURED AUTHORIZATION FOR UTILITY APPLICATIONS

TECHNICAL FIELD

This disclosure pertains to the management and control of operations associated with utility companies, and more particularly to the security of the systems that manage and control such operations.

BACKGROUND

Utility companies have complex, highly interconnected systems, which execute on physical servers that run a multitude of associated software modules for managing and controlling the operations of the utility company. FIG. 1 is a general block diagram of some of the components that might be found in a typical management and control system for a utility company that supplies electric power to customers, and possibly other commodities such as gas, water, etc. The back office 10 of the system comprises a number of individual subsystems associated with various operations of the utility, for example a customer information system (CIS) 12, a customer relations module (CRM) 14, an outage management system (OMS) 16, a GPS information system 18, a billing system 20, a grid stability module 22, and a user interface 24. Although not illustrated in FIG. 1, additional functional modules can be present in the back office 10. Some of these subsystems may have the ability to communicate with devices in the distribution network for the commodity being supplied, and remotely control operations associated with those devices. For example, the back office server may communicate with individual meters 26 located at customers' premises to obtain consumption data for billing purposes, and command the meters to selectively disconnect, or re-connect, the customer from or to the supply of one or more of the commodities provided by the utility company. Other commands from the back office server to individual meters may include commands to accept outbound energy flow from the customers.

In the example of FIG. 1, the meters constitute endpoint nodes that communicate with the back office by means of a local area network 30 having access points 32 that provide egress into and out of the network. In one embodiment, the local area network can be a wireless mesh network. The access points 32 communicate with servers at the back office 10 by means of a wide area network 34 or a dedicated communications link.

In a system of this type, one issue of concern is the secure management of remote disconnects and reconnects, which might occur when a customer vacates a premises or defaults on payments, or when a new customer takes possession of the premises, respectively. Malicious and/or erroneously issued commands to remotely disconnect and/or reconnect premises may have the potential to destabilize the electric power distribution grid. Unauthorized reconnects could also result in the theft of distributed power. To limit such possibilities, efforts must be made to ensure that command and control operations take place in a secure manner, and only by entities that are authorized to undertake such operations. However, since the back office of a typical utility consists of a variety of interconnected systems, enforcement of secure access becomes difficult. Many different groups within the utility need access to all or part of the software system, which complicates the ability to limit logical and/or physical access to individual subsystems.

One possible solution to this issue is to place certain systems, or parts of such systems, within a physically secure environment, referred to hereinafter as a bunker. Examples of a bunker include a restricted access room or container, e.g. a locked room, and a tamper-proof shell or enclosure around a protected system. The bunker severely restricts physical access to the hardware devices on which the systems, or protected portions of the systems, are executing. In addition, the systems within the bunker export very limited logical access. However, this solution still presents a challenging problem, in that it is difficult to refactor utility software systems to determine which portions need to be within the bunker, and which portions can remain outside of it to provide more flexible access to those who need it.

SUMMARY

To provide overall security to a utility management system, critical command and control messages that are issued to components of the system are required to be explicitly approved by a secure authority. The explicit approval authenticates the requested action and authorizes the performance of the specific action indicated in a message. Key components of the utility management and control system that are associated with access control are placed in a physically secure environment. With this approach, it only becomes necessary to physically secure those subsystems that are responsible for approving network actions, for example by means of a bunker. In other words, most of the management modules, such as the CIS, CRM, OMS, Billing, etc. can remain outside the bunker, thereby avoiding the need to partition those subsystems into bunkered and non-bunkered components. Access to critical components of each of the non-bunkered subsystems is controlled through the bunkered approval system.

DETAILED DESCRIPTION

To facilitate an understanding of the principles upon which the present invention is based, it is described hereinafter with reference to the secure control of remote connect and disconnect commands in an electric power distribution system. It will be appreciated, however, that such an example is not the only practical application of these principles. Rather, they can be employed in connection with any type of critical command which, if improperly or erroneously issued, could have the potential to severely disrupt or damage a system. Likewise, they can be used in conjunction with all commands and control messages sent to a critical component of the system whose proper operation is essential at all times.

Figure 1:
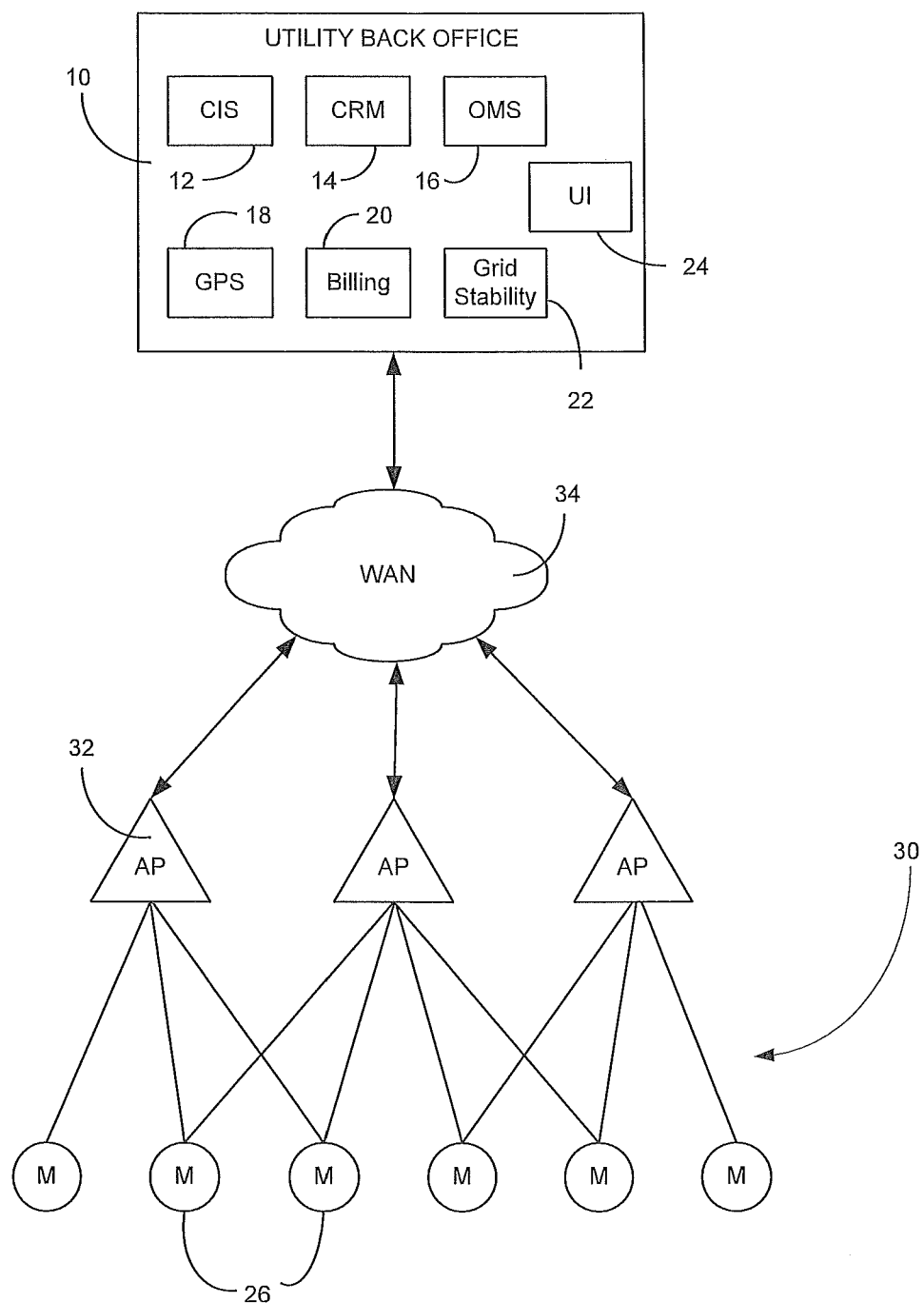
FIG. 1 is a general block diagram of a utility management and control system.
Figure 2:
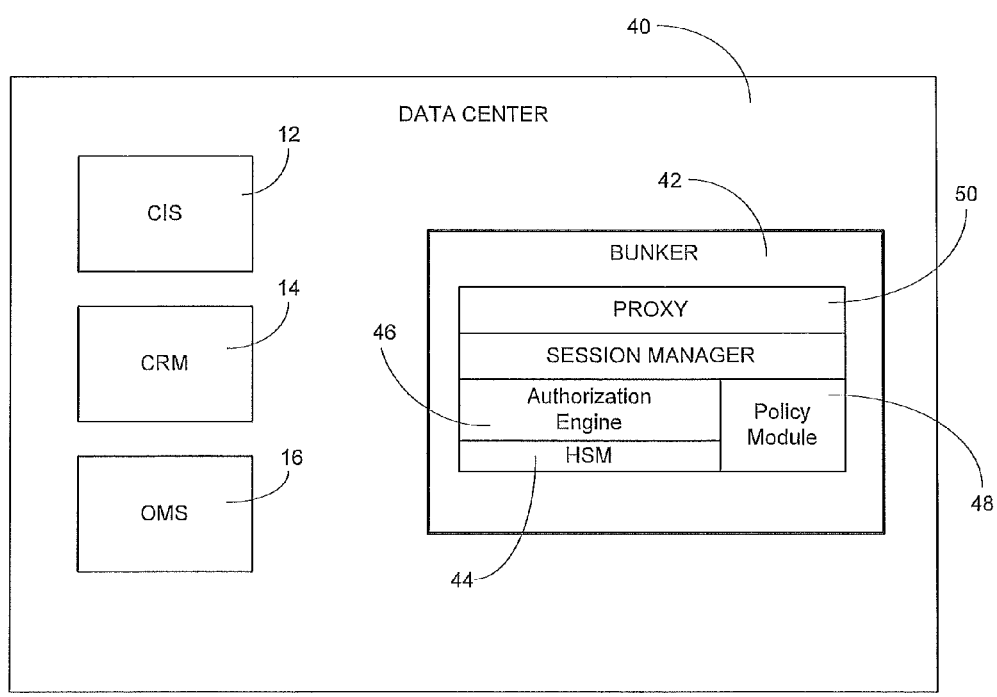
FIG. 2 is a block diagram of a utility back office system with bunkered components.

FIG. 2 illustrates an example of a data center 40 in which the concepts of the invention are implemented. As is conventional, the data center contains a number of physical servers on which various applications 12, 14, 16 are executed. Although only a few representative applications are illustrated in the figure, it will be appreciated that a larger number of such applications could be implemented within the data center. Conversely, the functions performed by any two or more of the applications may be integrated into a single, comprehensive program.

Also located within the data center is a physical bunker 42 having limited physical access, such as a locked room with reinforced walls. As another example, the bunker may be, in addition to or instead of being locked, an area that is closely watched or protected using security cameras, motion detectors, etc. As yet another example, the bunker may be physically distributed, with a security relationship having been established among the distributed parts. As yet another example, the bunker may be logically secured such as by using securely executing software and/or firmware whose functionality is secured from physical tampering, such as self-destructive packaging. The bunker need not be a room but, for example, may be a physically secure box.

One or more additional server devices having an associated hardware security module 44 are located within the bunker, for the implementation of an authorization engine 46 having software modules that perform security-related operations such as authorization, authentication and accounting. The hardware security module contains private and other secret keys in a secure fashion. It may also contain public certificates that are linked to the private keys. The hardware security module preferably uses a robust security algorithm such as elliptic curve cryptography or another highly secure cryptographic method to perform cryptographic operations. One example of hardware security modules that are suitable for the applications described herein is the SafeGuard CryptoServer line of hardware security modules from Utimaco Safeware AG.

Secure access to the bunker, and the server devices located within it, can be enforced with bio-sensor technology, e.g. fingerprint detection, physical keys or tokens, and/or password protection. In one implementation, a hierarchical, layered security system can be employed to maximize protection. If one layer of security fails, for example passwords are accidentally revealed or stolen, a higher-level security mechanism can be activated, such as a key or token actuated deadbolt lock, to maintain the physical security of the overall system.

Certain types of commands from non-bunkered back office applications 12-16, etc. are restricted, such that they will not be executed unless they are individually authenticated. For example, remote disconnect and re-connect commands are one category of these restricted commands, due to the potential that they present for serious disruption of the stability of the power distribution grid. To enforce security pertaining to these types of operations, the applications that carry them out may only accept commands to do so if they originate from a console within the bunker 42, or are otherwise authenticated by a permission issued from within the bunker 42. Thus, only personnel who have authority to issue those commands, and who possess the necessary means for access into the bunker, e.g. password, key, fingerprint, etc., will be able to issue the restricted commands to the application.

When an operation is initiated that causes a command to be generated, it may be signed or otherwise authenticated by the authorization engine 46, and then forwarded to an application programming interface (API) associated with the appropriate application external to the bunker 42. For instance, the command may be signed by a private key stored within the hardware security module 44. Upon receipt of the signed command at an external application, e.g. one of the applications 12-16 or an application running in one of the meters 26, it is verified by means of a public key to which the application has access. Once verified as having originated from within the bunker, the command is executed by the external application.

In some situations, it may not be practical for an entity that issues remote disconnect commands to be physically present within the bunker. If remote generation of such commands is supported, however, such commands could be issued maliciously by users impersonating authorized entities. To limit the possibility of such occurrences, in accordance with the invention a policy module 48 is implemented within the bunker. The policy module may be a separate software or firmware component, as depicted in FIG. 2, or be logically incorporated into the hardware security module, as described hereinafter. The policy module 48 may be reconfigured or reprogrammed in a secure manner, such as by commands entered from inside the bunker. This module contains business logic that examines a requested action and determines whether it will be permitted to be carried out. For instance, if re-connect commands are issued in a sequence, or with relative timing, that could disrupt the stability of the power distribution grid, they can be blocked by the policy and not passed on to the authorization engine for signature. In addition, policy flags can be raised and appropriate actions taken, such as disconnecting an entity issuing commands, when certain conditions are detected. These conditions can include, for example:

1. A large number of remote disconnect commands are issued at one time, e.g. within a predetermined time interval, indicating a possible intent to maliciously disconnect users from the power distribution grid;

2. Commands are issued in a suspicious order, such as a sequence of repetitive connect and disconnect commands that are associated with the same customer, or commands that are inconsistent with the current status of a customer, e.g., issuing a disconnect command to a user who is not already connected to the power grid;

3. A requesting application fails to provide necessary credentials, or otherwise be authenticated;

4. A requesting application is not among a set of approved applications having permission to issue certain operations; and 5 The state of the distribution network, based upon actual power loads and projected power requirements.

To implement this functionality, the bunker may contain a proxy 50 for the application programming interfaces (APIs) of the applications that are external to the bunker. In operation, when a call is made to the API for one of these "external" applications, the call is directed to the proxy 50 within the bunker. The proxy consults utility business logic in the policy module 48 that may be needed to authorize the request, and has the request signed by the appropriate business logic. The request is then passed on to the authorization engine 46 for signature. Once authorized, the proxy invokes the normal API for the called application that is external to the bunker, and passes along the authorized call.

In an alternative implementation, the bunker 42 may not include a proxy. In this case, a request may be made directly to the API of an external application. In turn, the external application calls the authorization engine within the bunker if it determines the requested operation requires a signature. As a default, all requests could be passed into the bunker for authorization, to avoid the need for any determination by the external application. The requests submitted to the bunker are first checked and signed by the policy module, and then passed to the authorization engine 46. Once a request is authorized, the called application acts upon the request.

Figure 3:
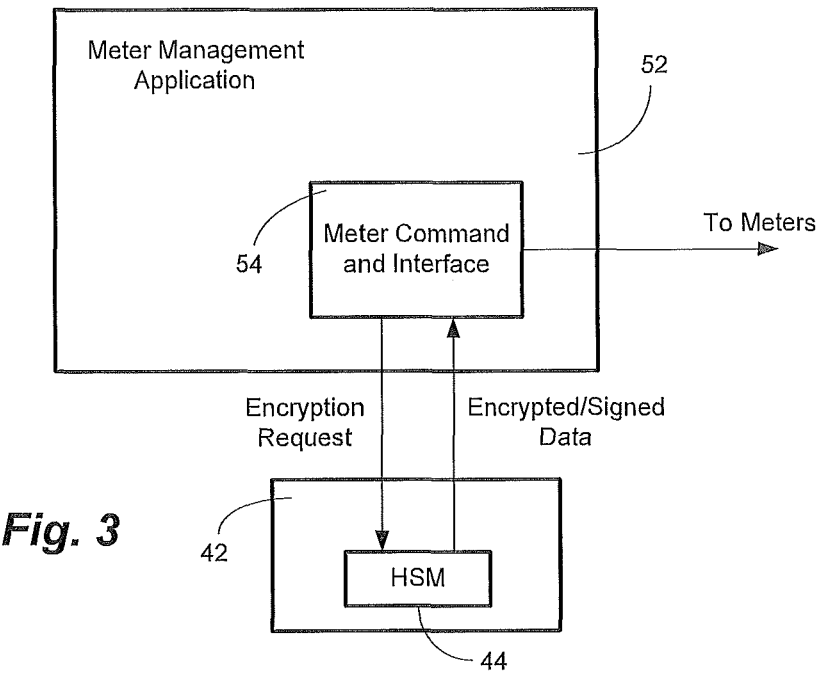
FIG. 3 is a block diagram schematically depicting the flow of data when a message is sent to a meter.

The hardware security module 44 included in the bunker 42 can operate at two levels. Examples are described hereinafter in connection with operations that are performed at the meters 26. At the first level of operation, the utility company might institute a policy that all communications between an application at the back office 10 and a meter 26, or any other component of the network 30, must be encrypted and signed. The implementation of this policy is depicted in the example of FIG. 3. In this example, a meter management application 52 has a message, e.g. a command, to send to one or more of the meters 26. This message is constructed in a meter command and interface module 54 of the application, and forwarded to the hardware security module 44 in the bunker 42, with a request to perform the appropriate encryption and signing of the message. The policy module 48 may first check to confirm that the request originated from an authorized source. If so, it is passed along to the hardware security module. The hardware security module 44 performs the requested operation on the message, using appropriate keys associated with the application, and returns the encrypted and signed data. The command and interface module 54 of the meter management application then creates a data packet incorporating the encrypted and signed message, and transmits it to the meter via the network 30.

For messages received from nodes in the network 30 by the application 52, they are first forwarded to the hardware security module, to be decrypted. The module 48 can also perform any appropriate verification of the authenticity of the sender of the received message, and integrity of the data. The verified and decrypted message is then returned to the application 52.

Figure 4:
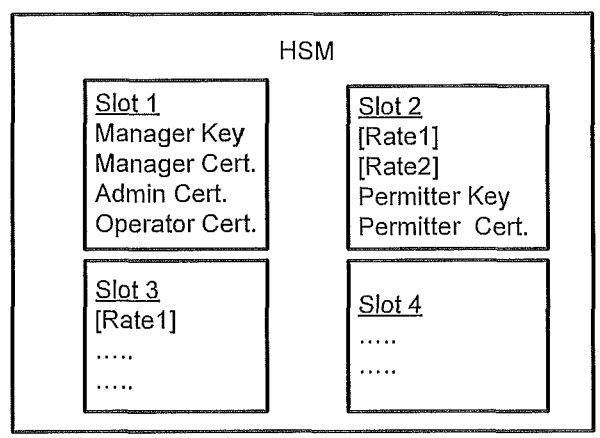
FIG. 4 is a block diagram of the configuration of a hardware security module.

For critical operations, such as remote connects and disconnects, the hardware security module can operate at a second level to enforce a rate limit on such operations. FIG. 4 depicts an example of the internal configuration of a hardware security module. The module is configured with a number of slots. Each slot contains a collection of private keys, certificates, secret keys and access privileges, to perform cryptographic services such as signing, encryption, decryption, etc. The different slots are associated with different security contexts, and contain the keys, certificates and other information pertinent to their respective contexts. Performing a cryptographic service on a command with the hardware security module, such as signing it with a private key, enables the recipient of the command, e.g. a node 26, to authenticate the source of the command, using an associated public key. The policy module 48 makes the initial determination whether a requested command is allowed to be presented to the hardware security module for one or more cryptographic services.

Each slot can be selectively configured with one or more rate limits, for example by means of a command line administration tool, to enforce desired business logic. An example of a command to configure a slot is as follows:

HSM_configure slot=2 rate-name="rate1" window=24 h count=10000

Such a command configures Slot 2 with a maximum rate limit of 10,000 cryptographic operations per 24-hour sliding window. If more than this allotted number of cryptographic operations occurs within the preceding 24 hours, the slot halts all further cryptographic operations. Thereafter, it will be necessary for an administrator to reset the slot by sending a reset command.

A slot can be configured with more than one rate, as follows:

HSM_configure slot=2 rate-name="rate1" window=24 h count=40000

HSM_configure slot=2 rate-name="rate2" window=60 m count=2000

These two commands configure Slot 2 with two rate limit windows, one for 40,000 cryptographic operations over a 24-hour sliding window, and another for 2000 cryptographic operations over a 60-minute sliding window.

If a slot is configured with a rate limit, all cryptographic operations executed in the slot are counted against the allotted limit over a sliding window. In the example given above, if there are more than 40,000 cryptographic operations in the past 24 hours, or more than 2000 cryptographic operations in the last 60 minutes, the slot halts any further cryptographic operations.

Figure 5:
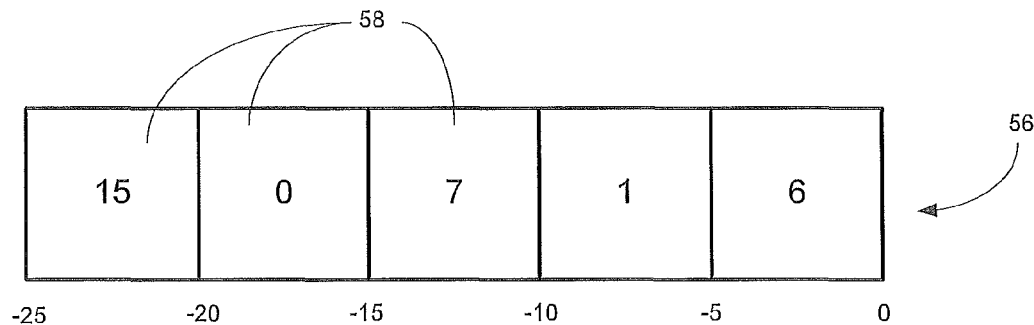
FIG. 5 is a block diagram of a multi-stage buffer that counts cryptographic operations over a sliding window.

In one embodiment, the accounting for threshold violations can be performed in 5-minute increments. FIG. 5 illustrates an example in which a slot has been configured with a limit of 800 cryptographic operations in a 25-minute sliding window. The sliding window can be implemented as a multi-stage buffer 56. The illustrated buffer comprises five stages 58, each of which represents a 5-minute interval of time. Each stage contains a count of the number of cryptographic operations performed by the slot during its corresponding time interval. The following table provides a snapshot of the data contained in the buffer at a given point in time.

| Stage | Time Frame | Count |
| --- | --- | --- |
| 1 | −25 to −20 minutes | 15 |
| 2 | −20 to −15 minutes | 0 |
| 3 | −15 to −10 minutes | 7 |
| 4 | −10 to −5 minutes | 1 |
| 5 | −5 to 0 minutes | 6 |

If the sum of all of the counts, in this case 15+0+7+1+6=29, exceeds the threshold, then the slot halts all further cryptographic operations until it is administratively reset. A warning mechanism can be implemented to notify administrative personnel prior to the time that operations are halted. For instance, a first warning might be generated when the total count exceeds 80% of a rate limit, and a second warning if it reaches 90% of the limit.

The stage associated with the most recent interval, in this case Stage 5, keeps a running count of each new cryptographic operation. At the end of each 5-minute interval, the stored counts are shifted to the next-oldest stage The latest stage is reset to zero, and begins to count the cryptographic operations anew for the next 5-minute interval.

Since each slot can be selectively configured with its own rate limits, flexibility is provided in the implementation of the business logic. For instance, as described hereinafter, certain critical commands may require an explicit type of authentication, hereinafter referred to as a "permit", before they can be executed. These commands might be mapped to a security context that is associated with a slot that carries out the permission procedures, and have particularly stringent rate limits. Other types of commands might be mapped to different security contexts and be encrypted and/or signed via a different slot having less stringent rate limits.

For critical commands, such as remote disconnect and reconnect commands, a higher level of security, may be appropriate such as approval by multiple parties, each of which must be authenticated at the receiving node. From the standpoint of network efficiency, however, it is desirable if the node, to which the command is directed, only needs to be contacted once to execute the command. In one aspect of the invention, these objectives can be achieved by means of a permitting system that provides all required information to enable the node to authenticate a command. In essence, every critical command that is sent to an application, such as a disconnect command to a meter, may be required to be accompanied by a permit. As noted above, different types of commands can be mapped to different security contexts. When a command is to be issued, either automatically by an application or through a user interface, the issuing application checks the security context of the command. If encryption is required, the command is forwarded to an appropriate slot of the hardware security module for such an operation. If a determination is made that the security context requires a permit, the command is forwarded to a permission server in the bunker that issues the permits. In one embodiment, the function of the permission server can be implemented by a slot in the hardware security module.

Figure 6:
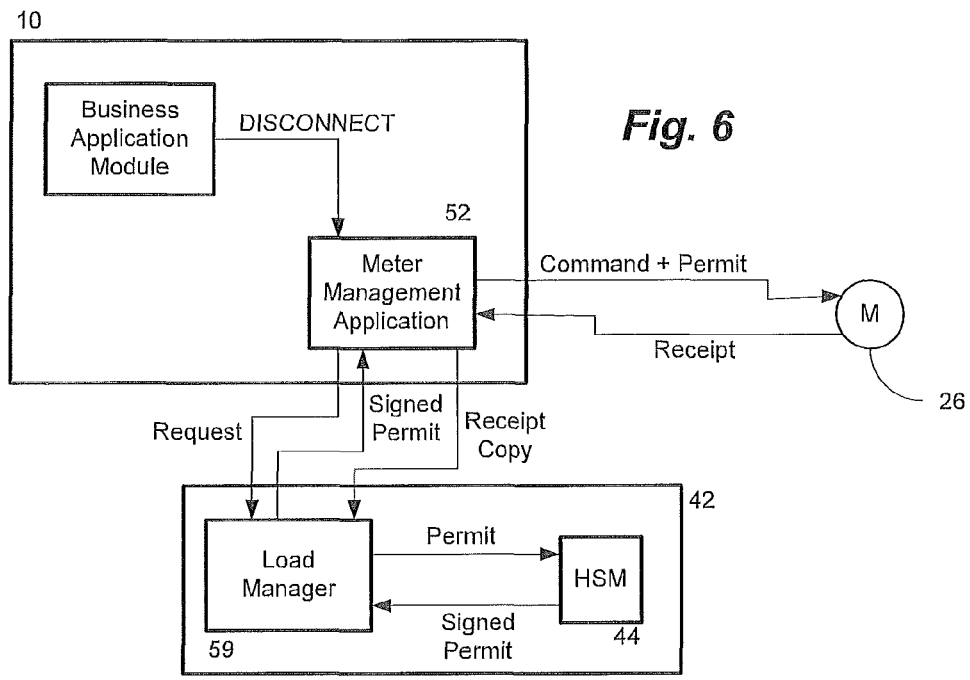
FIG. 6 illustrates an example of a system and procedure for issuing permits for commands.

One example of an arrangement and procedure for issuing permits is illustrated in FIG. 6, with reference to a command to disconnect a premises from the power distribution grid. In this example, one of the business modules in the back office 10, e.g., an accounting system, issues a command to the meter management application 52, to disconnect the premises associated with an account. Upon receipt of this command, the meter management application may schedule the disconnect operation for a particular time, and then sends a message to a load manager module 59 over a secure link, requesting permission to issue the command. The load manager is a component of the business logic that is located within the bunker 42 and determines whether load changes to the distribution grid may be detrimental. In this example, the load manager functions as one implementation of a permission server. The load manager can reject the request if a determination is made that the requested change may be detrimental, defer the request for a period of time, e.g. if too many requests are currently outstanding, or approve the request. The request to the load manager may include information such as the target node, the scheduled operation time, and the size of the time window needed to complete the execution of the command.

If the request is approved, the load manager creates a permit that can be recognized by the node to which the command is to be directed. Before the permit is returned to the meter management application 52, it is signed with a key associated with the load manager. In the illustrated example, the permission server, i.e. load manager 59 is separate from the hardware security module 44. In this case, therefore, the permit is sent to the hardware security module to be signed with the private key of the load manager. The signed permit is them returned to the load manager, to be forwarded on to the meter management application 52.

Upon receiving the signed permit, the meter management application sends the authorized command to the node 26 that is associated with the premises to be disconnected, together with the signed permit. The node can then verify the permit, for example by following a chain of certificates from the permit, through the load manager's credentials, to a root authority associated with the system operator for the power distribution grid. The node also verifies that the time values within the permit are consistent with the current time. If all information is correct and verified, the node executes the command and sends a signed receipt to the meter management application 52, indicating completion of the command. A copy of the receipt may be sent to the load manager 59, to enable it to keep track of outstanding requests.

The meter management application 52 can also sign the payload of the packet that is sent to the node, to provide two separate authorizations for the command that are issued by different control entities, namely the meter management application and the load manager. Both forms of authorization need to be verified by the node before it executes the command. In this example, the permission server, e.g. load manager, does not possess the credentials needed to communicate directly with the node 26. Rather, it provides credentials to another control entity, in this case the meter management application 52, for the execution of the authorized command.

The business logic for determining whether to approve a command can be relatively simple, e.g. a leaky bucket algorithm in which an initial burst of a predetermined number of disconnect operations is permitted, followed by a smaller number of operations per unit of time. In this case, the function of the load manager might be implemented within a slot of the hardware security module, using the rate control described previously. Another, more complex algorithm can be based on the state of the power distribution network, e.g. tracking actual power loads and making determinations based on projections of power requirements. This latter embodiment may be performed outside of the hardware security module, as depicted in FIG. 6, for example within a dedicated physical system, a virtualized server or an application on a shared system.

In addition to remote disconnects and reconnects, other types of commands can be required to have a permit, such as load limiting commands that are directed to a customer's premises to reduce consumption for a specified period of time. Furthermore, if the secure operation of a particular type of device in the system is critical to system stability, such as a distribution automation component, all commands issued to that device may be required to have a permit. Whenever a back office module issues a command to such a device, it forwards the command to the permission server, to obtain the necessary permit.

Figure 7:
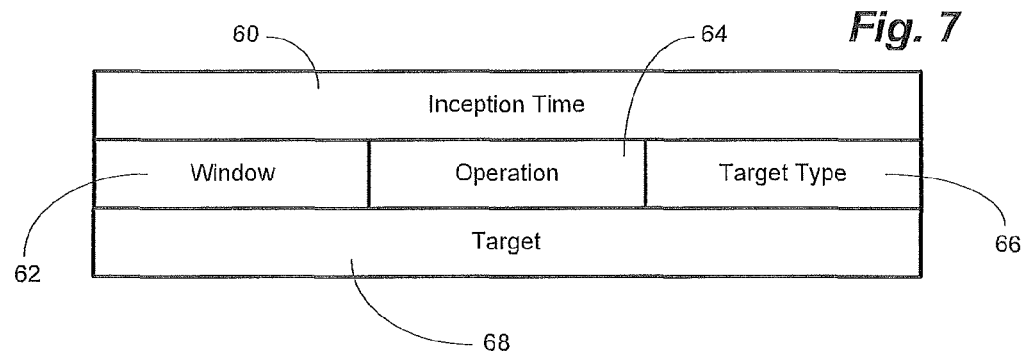
FIG. 7 is a block diagram of an exemplary format of a permit payload.

An exemplary format for a permit that is contained within the payload of a message is depicted in FIG. 7. The first field 60 of the permit payload indicates an inception time, namely the time at which the permit becomes valid. When a message containing a permit payload is received at a node, the node compares the inception time to its current time. If the inception time is later than the current time plus a predetermined increment, e.g. five minutes, the node rejects the permit as invalid.

The second field 62 of the permit payload indicates a duration window during which the permit remains valid. This field contains a value indicating the number of predetermined time intervals, e.g. five minute blocks, beyond the inception time that the permit is valid. If the node's current time is greater than the permit inception time plus the product of the predetermined interval and the window value, the permit is rejected as invalid. For instance, if the inception time is 1:00:00, the window value is 2, and the current time is 1:12:38, the permit will be rejected as having expired.

The next field 64 of the permit payload indicates the operation that is permitted to be carried out. For example, this field may contain a value that indicates a power disconnect operation, or a power reconnect operation. Multiple operations can be associated with a single permit. The target type field 66 indicates the format for the target field 68 that follows. The target field 68 designates the node, or device, that is to perform the permitted operation. For example, the target could be the MAC address of the node. The target type field 66 indicates the format in which this address is expressed, e.g. a DER octet string.

To further increase security, a constraint may be imposed that a disconnect or reconnect command can only be issued for one meter at a time. Before issuing a permit, the load manager may check to ensure that the target address for the device is associated with a single device, and is not a group or broadcast address.

The permit payload can be signed by the private key associated with a certificate having privileges for the indicated operation. Upon receiving the data packet containing the permit payload, the node first checks to see whether the indicated operation requires a permit. If a permit is required, the node confirms that the certificate and private key that were used to sign the permit have the necessary privileges to execute the requested operation. If the confirmation is affirmative, the node verifies the authenticity of the signed permit, as having been signed by the corresponding private key of the indicated certificate. The node then verifies that the target designation identifies the node itself. Finally, the node examines the inception time and window values, relative to its current time, to confirm that the permit has not expired.

If all of the verification checks are successful, the operation is executed, and a response is returned to confirm successful execution. If any of the verification steps fails, the permit is rejected, and an error message is returned. As soon as all of the operations in the data packet have been completed, or an error message is returned, the permit is discarded and not retained further.

In the event that access to the bunker is compromised, a suitable form of remedial action may be implemented. One such solution is to provide a logical or physical panic button that is associated with a bunker. This panic button can be activated (such as by a person depressing a physical button or activating a user interface element, or by logic that makes an appropriate determination automatically) to inform the management system that the bunker associated with the panic button is compromised, and should no longer be trusted. For example, any requests for remote disconnect services that are signed by a compromised bunker should be ignored.

The panic button can be implemented in a variety of ways. Suitable examples include control signals that are sent via a wireless or wired communication system, physical push buttons at suitable locations, e.g., on employee desks, that are connected to a local or wide area network, and/or wearable devices with audio command capabilities and wireless connectivity.

Figure 8:
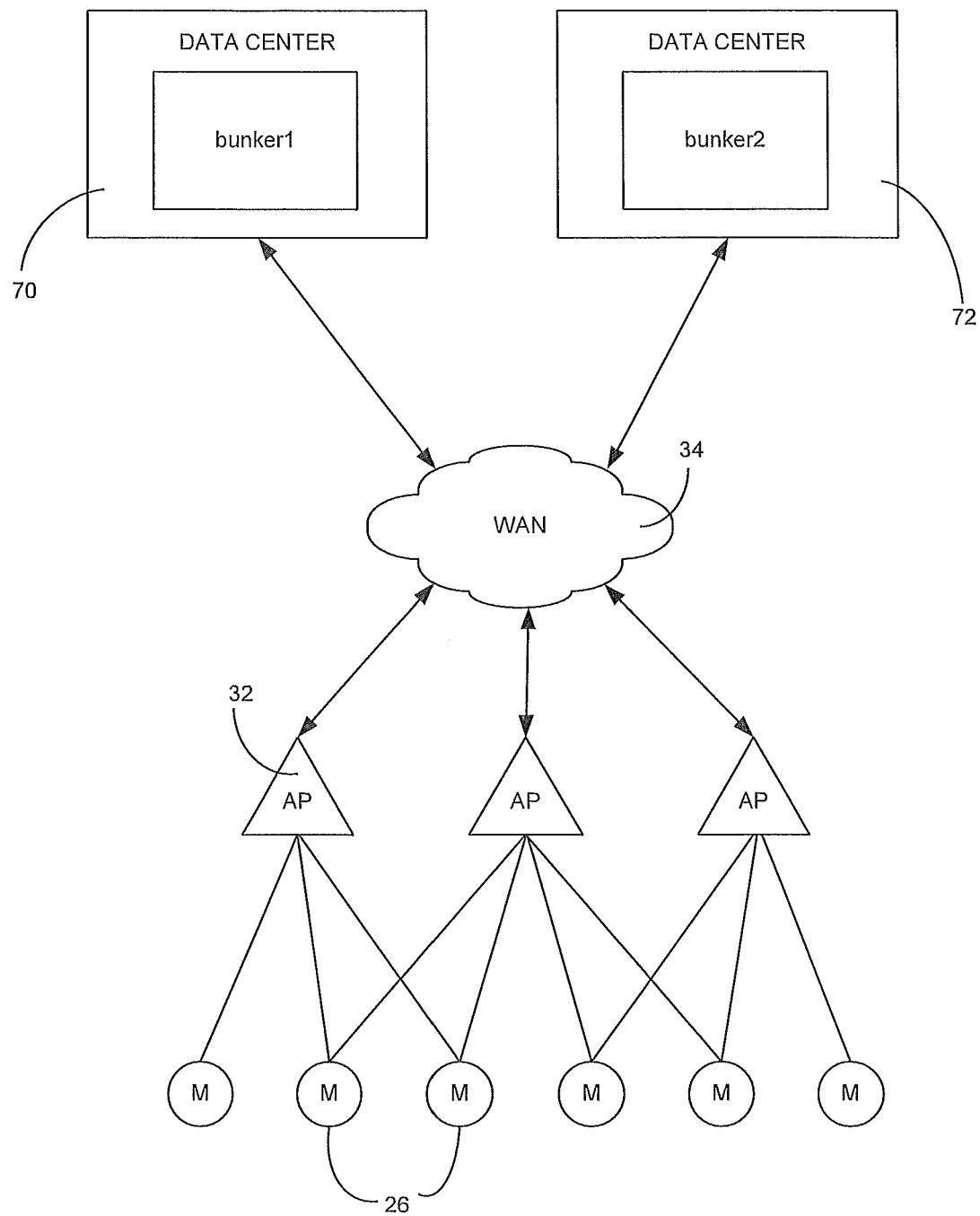
FIG. 8 is a block diagram of a utility control and management system implemented in multiple data centers.

FIG. 8 illustrates an example of a system in which the functionality of a panic button can be implemented. In this example, the utility management and control system is housed within two data centers 70 and 72. For instance, each data center might contain a complete instance of the various management and control subsystems, for redundancy. Each data center contains an associated bunker, respectively labeled "bunker1" and "bunker2". Each bunker has a certificate with a certificate chain whose root is in a known authority. The certificates for the two bunkers are different from one another.

Each of the nodes in the control network, e.g., access points 32 and endpoint nodes 26, has the ability to store and install a certificate revocation list. The access points 32 also have the ability to filter source addresses.

An exemplary operation will be described for a situation in which access to bunker1 has been compromised. A panic button associated with bunker1 is activated, and the resulting panic signal is sent to a server in bunker2 that implements the panic button function. This panic signal includes an appropriate indication of the authentication of the device from which it is sent. For example, it might include a signature associated with the device, or be accompanied by a hash value generated according to a predetermined algorithm. Upon receipt of an authenticated panic signal, the server in bunker2 issues commands to configure a firewall rule for all of the access points 32, which instructs them to drop packets that originate from data center 70. The server in bunker2 also issues commands to configure a certificate revocation list on all of the access points, which indicates that the certificate associated with bunker1 is no longer valid. The server in bunker2 also sends a message to every endpoint node, instructing it to reload its certificate revocation list from an access point.

By configuring the firewall filter on the access point to drop packets from data center 70, a would-be attacker may be slowed down a period of time sufficient to enable the certificate revocation lists to be propagated to all of the endpoint nodes. In order to recover bunker1 after a potential breach has occurred, a new certificate must be installed, and new associations with that certificate are made and propagated to all of the nodes in the control network.

In summary, the disclosed invention provides a variety of security features to reduce the risk of malicious or otherwise inappropriate actions associated with the delivery of commodities provided by utilities. Critical commands that have the potential to disrupt the stability of a utility distribution network are secured through the mechanism of a physical bunker that limits access to sensitive components of the back office management system, in conjunction with the use of a hardware security module for authenticating, signing and encrypting such commands. A permit-based authorization framework provides a finer-grained level of security for a particularly critical commands. The hardware security module can also be configured to limit the rate at which commands are executed, to further impede attempts to issue improper sequences of commands.

It will be appreciated by those of ordinary skill in the art that the disclosed concepts can be embodied in other specific forms without departing from the spirit or essential characteristics thereof. The presently disclosed embodiments are considered in all respects to be illustrative, and not restrictive. The scope of the invention is indicated by the appended claims, rather than the foregoing description, and all changes that come within the meaning and range of equivalents thereof are intended to be embraced therein.

What is claimed is:

1. A method for controlling devices in a utility network, comprising:
   determining, in a back office system of the utility network, whether a command to be carried out by a device in the utility network requires a permit for the command to be performed;
   generating, in the back office system, the command for an operation to be carried out by the device in the utility network based on the determination of whether the command requires a permit for the command to be performed;

generating, in the back office system, the command as a first type of command which requires a permit for the command to be performed upon determining that the command requires a permit for the command to be performed, and generating, in the back office system, the command as a second type of command which does not require a permit for the command to be performed upon determining that the command does not require a permit for the command to be performed;

forwarding the generated first type of command to a permission server which is a secured component of the back office system and has the authority to authorize whether a command can be forwarded to a device;

within the permission server, generating a permit that specifies (i) a period for which the permit is valid, (ii) the operation to be performed, and (iii) the device that is to perform the operation;

transmitting a data packet containing the permit to a device in the utility network;

upon receiving the data packet at the device, determining whether the specified operation requires a permit, and if so whether the permit is currently valid; and performing the specified operation if the permit is currently valid.

2. The method of claim 1, wherein the permit contains an inception value that indicates when the permit becomes valid, and a duration value that indicates the length of time that the permit remains valid from the inception value.

3. The method of claim 1, wherein the permit includes a first field that contains an identification of the device that is to perform the operation, and a second field that indicates the format for the first field.

4. The method of claim 3, wherein the identification contained in the first field comprises a MAC address of the device.

5. The method of claim 3, wherein the format is a DER octet string.

6. The method of claim 1, wherein the permit is signed with a key associated with the permission server, and the device verifies the signature of the permit.

7. The method of claim 1, wherein the permission server is implemented within a hardware security module.

8. A method for controlling devices in a utility network, comprising:

generating, in a back office system of the utility network, a command for an operation to be carried out by a device in the utility network;

determining, in the back office system, whether the generated command requires a permit for the generated command to be performed;

if the generated command requires a permit, forwarding the command to a permission server which is a secured component of the back office system and has the authority to authorize whether a command can be forwarded to a device;

within the permission server, generating a permit that specifies (i) a period for which the permit is valid, (ii) the operation to be performed, and (iii) the device that is to perform the operation;

transmitting a data packet containing the permit to a device in the utility network;

upon receiving the data packet at the device, determining whether the specified operation requires a permit, and if so whether the permit is currently valid; and performing the specified operation if the permit is currently valid, wherein the permission server is implemented within a hardware security module, wherein the hardware security module executes the following functions:

counting the number of permits generated by the hardware security module in a specified time period, and if the counted number of permits generated within the specified time period exceeds a threshold limit, terminating the generation of further permits for received commands.

9. The method of claim 8, wherein the counting of the number of generated permits is performed over a sliding time window of the specified period.

10. The method of claim 9, wherein the counting of the number of generated permits is performed with respect to a plurality of sliding time windows, each of which is associated with a different respective length of time and threshold limit.

11. An authentication system for a utility network, comprising:

a back office system configured to determine whether a command to be carried out by a device in the utility network requires a permit for the command to be performed, and to generate the command for the operation to be carried out by the device in the utility network based on the determination of whether the command requires a permit for the command to be performed, wherein the back office system is configured to generate the command as a first type of command which requires a permit for the command to be performed upon determining that the command requires a permit for the command to be performed, and to generate the command as a second type of command which does not require a permit for the command to be performed upon determining that the command does not require a permit for the command to be performed;

a permission server, which is a secured component of the back office system, the permission server being configured to receive the generated first type of command from the back office system when the back office system determines that the generated command requires a permit, and to generate a permit that specifies (i) a period for which the permit is valid, (ii) the operation to be performed, and (iii) the device that is to perform the operation; and a communication interface configured to transmit a data packet containing the permit to a device in the utility network.

12. The authentication system of claim 11, wherein the permit contains an inception value that indicates when the permit becomes valid, and a duration value that indicates the length of time that the permit remains valid from the inception value.

13. The authentication system of claim 11, wherein the permission server is implemented in a hardware security module.

14. An authentication system for a utility network, comprising:

a back office system configured to generate a command for an operation to be carried out by a device in the utility network, and to determine whether the generated command requires a permit for the generated command to be performed;

a permission server, which is a secured component of the back office system, the permission server being configured to receive the generated command from the back office system when the back office system determines that the generated command requires a permit, and to generate a permit that specifies (i) a period for which the permit is valid, (ii) the operation to be performed, and (iii) the device that is to perform the operation; and a communication interface configured to transmit a data packet containing the permit to a device in the utility network, wherein the permission server is implemented in a hardware security module, and wherein the hardware security module is configured to execute the following functions:

count the number of permits generated by the hardware security module in a specified time period, and if the counted number of permits generated within the specified time period exceeds a threshold limit, terminate the generation of further permits for received commands.

15. The authentication system of claim 14, wherein the counting of the number of generated permits is performed over a sliding time window of the specified period.

16. The authentication system of claim 15, wherein the counting of the number of generated permits is performed with respect to a plurality of sliding time windows, each of which is associated with a different respective length of time and threshold limit.

17. The authentication system of claim 11, further including a physically secure environment in which the permission server is housed.

18. A utility network, comprising:
a back office system configured to determine whether a command to be carried by a device in the utility network requires a permit for the command to be performed, and to generate the command for the operation to be carried out by the device in the utility network based on the determination of whether the command requires a permit for the command to be performed, wherein the back office system is configured to generate the command as a first type of command which requires a permit for the command to be performed upon determining that the command requires a permit for the command to be performed, and to generate the command as a second type of command which does not require a permit for the command to be performed upon determining that the command does not require a permit for the command to be performed;

a permission server, which is a secured component of the back office system, the permission server being configured to receive the generated first type of command from the back office system when the back office system determines that the generated command requires a permit, and to generate a permit that specifies (i) a period for which the permit is valid, (ii) the operation to be performed, and (iii) the device that is to perform the operation;

a communication interface configured to transmit a data packet containing the permit via the utility network; and a plurality of devices connected to the utility network for receiving data packets, each of said devices being configured to:

determine whether an operation specified in a received data packet requires a permit, if so, determine whether the permit is currently valid; and perform the specified operation if the permit is currently valid.

19. The utility network of claim 18, wherein the permit contains an inception value that indicates when the permit becomes valid, and a duration value that indicates the length of time that the permit remains valid from the inception value.

20. The utility network of claim 18, wherein the permission server is configured to sign the permit using a key, and the device is configured to verify the signature of the permit.

21. The utility network of claim 18, wherein the permission server is implemented in a hardware security module.

22. A utility network, comprising:
a back office system configured to generate a command for an operation to be carried out by a device in the utility network, and to determine whether the generated command requires a permit for the generated command to be performed a permission server, which is a secured component of the back office system, the permission server being configured to receive the generated command from the back office system when the back office system determines that the generated command requires a permit, and to generate a permit that specifies (i) a period for which the permit is valid, (ii) the operation to be performed, and (iii) the device that is to perform the operation;

a communication interface configured to transmit a data packet containing the permit via the utility network; and a plurality of devices connected to the utility network for receiving data packets, each of said devices being configured to:

determine whether an operation specified in a received data packet requires a permit, if so, determine whether the permit is currently valid; and perform the specified operation if the permit is currently valid, wherein the permission server is implemented in a hardware security module, and wherein the hardware security module is configured to execute the following functions:

count the number of permits generated by the hardware security module in a specified time period, and if the counted number of permits generated within the specified time period exceeds a threshold limit, terminate the generation of further permits for received commands.

23. The utility network of claim 22, wherein the counting of the number of generated permits is performed over a sliding time window of the specified period.

24. The utility network of claim 23, wherein the counting of the number of generated permits is performed with respect to a plurality of sliding time windows, each of which is associated with a different respective length of time and threshold limit.

25. The method of claim 1, wherein the permission server is comprised in a physically secure environment in a data center of the back office system.

26. The method of claim 1, wherein the back office system is comprised in a plurality of data centers, and the permission server is distributed across the plurality of data centers.

27. The authentication system of claim 11, wherein the permission server is comprised in a physically secure environment in a data center of the back office system.

28. The authentication system of claim 11, wherein the back office system is comprised in a plurality of data centers, and the permission server is distributed across the plurality of data centers.

29. The utility network of claim 18, wherein the permission server is comprised in a physically secure environment in a data center of the back office system.

30. The utility network of claim 18, wherein the back office system is comprised in a plurality of data centers, and the permission server is distributed across the plurality of data centers.

31. The method of claim 1, wherein the back office system is connected to at least one access point via a first network, and the at least one access point is connected to the device in the utility network via a second network distinct from the first network, and wherein the utility network includes the first and second networks.

32. The authentication system of claim 11, wherein the back office system is connected to at least one access point via a first network, and the at least one access point is connected to the device in the utility network via a second network distinct from the first network, and wherein the utility network includes the first and second networks.

33. The utility network of claim 18, wherein the back office system is connected to at least one access point via a first network, and the at least one access point is connected to the plurality of devices in the utility network via a second network distinct from the first network, and wherein the utility network includes the first and second networks.

\* \* \* \* \*